US011221866B2

(12) United States Patent
Cao et al.

(10) Patent No.: US 11,221,866 B2
(45) Date of Patent: Jan. 11, 2022

(54) ACCELERATOR LOADING METHOD, SYSTEM, AND APPARATUS

(71) Applicant: Huawei Technologies Co., Ltd., Shenzhen (CN)

(72) Inventors: Qian Cao, Nanjing (CN); Yuping Zhao, Nanjing (CN); Xinyu Hu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 193 days.

(21) Appl. No.: 16/407,934

(22) Filed: May 9, 2019

(65) Prior Publication Data

US 2019/0266006 A1    Aug. 29, 2019

Related U.S. Application Data

(63) Continuation of application No. PCT/CN2017/105880, filed on Oct. 12, 2017.

(30) Foreign Application Priority Data

Nov. 9, 2016    (CN) .......................... 201610989129.9

(51) Int. Cl.
*G06F 9/46* (2006.01)
*G06F 9/455* (2018.01)
(Continued)

(52) U.S. Cl.
CPC ............ *G06F 9/45558* (2013.01); *G06F 8/63* (2013.01); *G06F 8/71* (2013.01); *G06F 9/445* (2013.01);
(Continued)

(58) Field of Classification Search
CPC .......... G06F 9/45558; G06F 8/63; G06F 8/71; G06F 9/445
See application file for complete search history.

(56) References Cited

U.S. PATENT DOCUMENTS 6,510,469 B1 * 1/2003 Starnes .................. G06K 9/222
709/247
8,914,626 B1   12/2014 Adogla et al.
(Continued)

FOREIGN PATENT DOCUMENTS

CN    102906738 A    1/2013
CN    103092678 A    5/2013
(Continued)

OTHER PUBLICATIONS

Foreign Communication From A Counterpart Application, Chinese Application No. 201610989130.1, Chinese Office Action dated Aug. 5, 2019, 7 pages.
Machine Translation and Abstract of Chinese Publication No. CN103092678, May 8, 2013, 20 pages.
Machine Translation and Abstract of Chinese Publication No. CN103399758, Nov. 20, 2013, 21 pages.
(Continued)

*Primary Examiner* — Camquy Truong
(74) *Attorney, Agent, or Firm* — Conley Rose, P.C.

(57) ABSTRACT

An accelerator loading apparatus obtains an acceleration requirement, where the acceleration requirement includes an acceleration function and acceleration performance of a to-be-created virtual machine, determines an image that meets the acceleration function and the acceleration performance, and determines a target host in which an available accelerator that can load the image is located, and then sends an image loading command to the target host. The image loading command includes a descriptor of the image, and is used to enable the target host to load the image for the available accelerator. In the method, a target host that can create the virtual machine may be determined based on the acceleration function and the acceleration performance of the to-be-created virtual machine, and an image used for acceleration is loaded to an available accelerator of the target host, to implement dynamic accelerator loading and deployment.

20 Claims, 6 Drawing Sheets

(51) Int. Cl.
*G06F 9/445* (2018.01)
*G06F 8/61* (2018.01)
*G06F 8/71* (2018.01)

(52) U.S. Cl.
CPC .............. *G06F 9/44521* (2013.01); *G06F 2009/45562* (2013.01); *G06F 2009/45575* (2013.01); *G06F 2009/45595* (2013.01)

(56) References Cited

U.S. PATENT DOCUMENTS

| | | | |
|---|---|---|---|
| 9,378,043 | B1 | 6/2016 | Zhang et al. |
| 9,424,136 | B1 | 8/2016 | Teater et al. |
| 9,483,291 | B1 | 11/2016 | Chen et al. |
| 9,824,018 | B2 * | 11/2017 | Joshi ................ G06F 3/0673 |
| 10,698,717 | B2 | 6/2020 | Tang et al. |
| 2015/0089495 | A1 | 3/2015 | Persson et al. |
| 2015/0261550 | A1 | 9/2015 | Kruglick |
| 2015/0319086 | A1 | 11/2015 | Tripathi et al. |
| 2015/0358248 | A1 | 12/2015 | Saha et al. |
| 2016/0132329 | A1 | 5/2016 | Gupte et al. |
| 2016/0210167 | A1 | 7/2016 | Bolic et al. |
| 2016/0239424 | A1 | 8/2016 | Chan et al. |
| 2016/0294643 | A1 * | 10/2016 | Kim .................... H04L 67/16 |
| 2017/0039089 | A1 | 2/2017 | Xia et al. |
| 2017/0177396 | A1 | 6/2017 | Palermo et al. |
| 2017/0279672 | A1 | 9/2017 | Krishnan et al. |
| 2017/0300437 | A1 | 10/2017 | Shi et al. |
| 2018/0210752 | A1 | 7/2018 | Tang et al. |
| 2018/0373895 | A9 | 12/2018 | Durham et al. |
| 2019/0129874 | A1 | 5/2019 | Huang |
| 2019/0266006 | A1 | 8/2019 | Cao et al. |
| 2020/0226776 | A1 * | 7/2020 | Toma .................... G06T 7/77 |

FOREIGN PATENT DOCUMENTS

| | | | |
|---|---|---|---|
| CN | 103399758 | A | 11/2013 |
| CN | 104951353 | A | 9/2015 |
| CN | 105159753 | A | 12/2015 |
| CN | 105262664 | A | 1/2016 |
| CN | 105577801 | A | 5/2016 |
| CN | 105579959 | A | 5/2016 |
| CN | 105979007 | A | 9/2016 |
| CN | 108073423 | A | 5/2018 |

OTHER PUBLICATIONS

Machine Translation and Abstract of Chinese Publication No. CN105979007, Sep. 28, 2016, 33 pages.
"Network Functions Virtualisation (NFV); Acceleration Technologies; Report on Acceleration Technologies and Use Cases," ETSI GS NFV-IFA 001, V1.1.1, Dec. 2015, 38 pages.
"Network Functions Virtualisation (NFV); Acceleration Technologies; Management Aspects Specification," ETSI GS NFV-IFA 004, V2.1.1, Apr. 2016, 24 pages.
"Network Functions Virtualisation (NFV); NFV Acceleration; Acceleration Resource Management Interface Specification," ETSI GS NFV-IFA 019, V0.5.3, Apr. 2017, 44 pages.
"OpenStack Enhanced Platform Awareness," White Paper, Sep. 25, 2015, 8 pages.
"Nomad," Retrieved from https://wiki.openstack.org/wiki/Nomad, Jun. 18, 2019, 5 pages.
Foreign Communication From A Counterpart Application, Chinese Application No. 201610989129.9, Chinese Office Action dated Apr. 1, 2019, 6 pages.
Foreign Communication From A Counterpart Application, PCT Application No. PCT/CN2017/105880, English Translation of International Search Report dated Dec. 22, 2017, 2 pages.
Foreign Communication From A Counterpart Application, PCT Application No. PCT/CN2017/105880, English Translation of Written Opinion dated Dec. 22, 2017, 4 pages.
Foreign Communication From A Counterpart Application, PCT Application No. PCT/CN2017/105878, English Translation of International Search Report dated Jan. 23, 2018, 2 pages.
Foreign Communication From A Counterpart Application, PCT Application No. PCT/CN2017/105878, English Translation of Written Opinion dated Jan. 23, 2018, 4 pages.
Krsul, I., et al., "VMPlants: Providing and Managing Virtual Machine Execution Environments for Grid Computing," XP058095912, Proceedings of the 2004 ACM/IEEE Conference on Supercomputing, Nov. 6, 2004, 12 pages.
Foreign Communication From A Counterpart Application, European Application No. 17868926.1, Extended European Search Report dated Nov. 13, 2019, 9 pages.
Google Cloud Platform, "Creating and Starting an Instance," Sep. 24, 2016, 6 pages.

* cited by examiner

| Identifier of a host | Identifier of an accelerator | Accelerator model | Acceleration function | Acceleration performance | Attribute of an accelerator | Status of an accelerator |
|---|---|---|---|---|---|---|
| H1 | A11 | M11 | Layer 3 forwarding | 10 Gbps | Unloadable | Allocated |
|  | A12 | M12 |  |  | Loadable | Idle |
| H2 | A21 | M21 | Encryption | 20 Gbps | Loadable | Locked |
| … | … | … | … | … | … | … |

FIG. 5A

| Identifier of a host | Identifier of an accelerator | Accelerator model | Acceleration function | Acceleration performance | Attribute of an accelerator | Status of an accelerator |
|---|---|---|---|---|---|---|
| H1 | A11 | M11 | Layer 3 forwarding | 10 Gbps | Unloadable | Allocated |
|  | A12 | M12 | VXLAN forwarding | 20 Gbps | Loadable | Locked |
| H2 | A21 | M21 | Encryption | 20 Gbps | Loadable | Locked |
| … | … | … | … | … | … | … |

ACCELERATOR LOADING METHOD, SYSTEM, AND APPARATUS

CROSS-REFERENCE TO RELATED APPLICATIONS

This application is a continuation application of Int'l Patent App. No. PCT/CN2017/105880 filed on Oct. 12, 2017, which claims priority to Chinese Patent App. No. 201610989129.9 filed on Nov. 9, 2016, which are incorporated by reference.

TECHNICAL FIELD

The disclosure relates to acceleration technologies, and in particular, to an accelerator loading method, system, and apparatus.

BACKGROUND

A network of a network operator usually includes various large-scale and rapidly increasing hardware devices. A new-type device is usually required to develop a new network service or network function. It is increasingly difficult to search for space and provide a power supply for the new-type device. More seriously, a hardware lifecycle becomes increasingly short while service creation is accelerated. It suppresses deployment of new value-added services, and limits ever-increasing innovation centered on a network.

Network functions virtualization (NFV) combines, by using virtualization technologies, many types of network devices into high-capacity servers, switches, or storage devices that meet an industrial standard. The servers, the switches, or the storage devices may be deployed in a data center, a network node, or a client. The NFV implements flexible software loading, and therefore accelerates a network deployment and adjustment speed, reduces service deployment complexity, and improves unification, universalization, and adaptation of network devices.

An NFV architecture uses industrially standard hardware, and performance of the NFV architecture deteriorates when the standard hardware processes a large quantity of network functions. Therefore, to resolve the problem that the performance of the NFV architecture deteriorates, NFV hardware acceleration becomes an important research direction. Specifically, hardware acceleration means that a specific network function is implemented by using dedicated and more efficient hardware, and the hardware that implements the function is referred to as an accelerator.

Currently, an acceleration function may be provided in two manners: In a first manner, an accelerator manufacturer provides fixed-function acceleration. In a second manner, an accelerator manufacturer provides an image having an acceleration function, a loading function of the image is provided in a driver provided by the manufacture, and the image is locally loaded in a server. In this way, the server may implement different acceleration functions by loading images having different functions.

However, when loading an image, an existing accelerator can load only an image having a specific function, and cannot dynamically load different images as required and cannot implement different functions. In this way, when different acceleration functions are required, corresponding hardware accelerators need to be provided, and consequently resources are wasted.

SUMMARY

To resolve the foregoing problem, the disclosure provides an accelerator loading method, system, and apparatus, so that an image that meets an acceleration requirement of a to-be-created virtual machine can be dynamically loaded for an accelerator, thereby implementing accelerator allocation as required, and saving hardware resources.

According to a first aspect of the disclosure, an accelerator loading method is provided. An accelerator loading apparatus obtains an acceleration requirement, where the acceleration requirement includes an acceleration function of a to-be-created virtual machine and acceleration performance of the to-be-created virtual machine. The accelerator loading apparatus determines an image that meets the acceleration function and the acceleration performance, and determines a target host in which an available accelerator that can load the image is located. The accelerator loading apparatus sends an image loading command to the target host. The image loading command includes a descriptor of the image and an identifier of the available accelerator, and the image loading command is used to enable the target host to load the image for the available accelerator based on the image loading command.

In the foregoing manner, an image that meets the acceleration requirement may be loaded for the available accelerator based on an acceleration requirement of the to-be-created virtual machine, so that the available accelerator has a function corresponding to the acceleration requirement, thereby implementing accelerator allocation as required.

In a first implementation of the first aspect, when determining the image that meets the acceleration function and the acceleration performance, the accelerator loading apparatus searches an accelerator image repository based on the acceleration function and the acceleration performance to determine the image that meets the acceleration requirement and obtain a descriptor of the image and an accelerator model corresponding to the image. The descriptor of the image is at least one of an identifier of the image and a location of the image. The accelerator image repository is configured to store an image and image information. Image information of each image includes a descriptor of the image, an accelerator model corresponding to the image, an acceleration function that can be provided by the image, and acceleration performance that can be provided by the image.

The disclosure provides the accelerator image repository that is specially configured to store an image that can be dynamically loaded and image information, so that the image that meets the acceleration requirement of the to-be-created virtual machine can be provided for the available accelerator, thereby managing images together.

Based on the first implementation of the first aspect, in a second implementation of the first aspect, when determining the target host in which the available accelerator that can load the image is located, the accelerator loading apparatus determines at least one candidate host corresponding to the accelerator model and an available accelerator of each candidate host. The accelerator loading apparatus further determines one of the at least one candidate host as the target host.

In actual deployment, the accelerator loading apparatus may manage a large quantity of hosts. Therefore, there may be a plurality of hosts that meet the acceleration function and the acceleration performance of the to-be-created virtual machine, but finally only one host can be selected as a target host of the to-be-created virtual machine. A most appropriate host can be selected as the target host in the disclosure, so that operating efficiency of an entire system can be improved.

Based on the second implementation of the first aspect, in a third implementation of the first aspect, when determining the at least one candidate host corresponding to the accelerator model and the available accelerator of each candidate host, the accelerator loading apparatus obtains a host list corresponding to the acceleration requirement. The host list includes an identifier of at least one host that meets the acceleration requirement. The accelerator loading apparatus searches the acceleration database based on the accelerator model and the host list to determine the at least one candidate host corresponding to the accelerator model in the host list and the available accelerator of each candidate host. The acceleration database is configured to store acceleration information of each host managed by the accelerator loading apparatus, and the acceleration information of each host includes an identifier of the host, an identifier of each accelerator of the host, an accelerator model of the accelerator, an acceleration function of the accelerator, acceleration performance corresponding to the acceleration function of the accelerator, an attribute of the accelerator, and a status of the accelerator.

In the disclosure, the acceleration database stores an accelerator corresponding to each host and information about each accelerator. In this implementation, the accelerator loading apparatus may find a most appropriate available accelerator by using the acceleration database. When the image is loaded by using the available accelerator, and the available accelerator is allocated to the to-be-created virtual machine for use after the image is loaded, so that operating efficiency of a system can be improved to a maximum extent. In addition, the available accelerator may alternatively be an accelerator that has been allocated to a virtual machine for use and that is then released by the virtual machine, in other words, the available accelerator may be repeatedly loaded. In this way, hardware resources are greatly saved.

Based on the third implementation of the first aspect, in a fourth implementation of the first aspect, when obtaining the acceleration requirement, the accelerator loading apparatus obtains a request for creating a virtual machine. The request for creating a virtual machine includes a computing resource requirement of the to-be-created virtual machine, a storage resource requirement of the to-be-created virtual machine, and the acceleration requirement, and the acceleration requirement is an acceleration requirement of the to-be-created virtual machine. When obtaining the host list corresponding to the acceleration requirement, the accelerator loading apparatus searches, based on the computing resource requirement and the storage resource requirement, all hosts managed by the accelerator loading apparatus for one or more hosts that can meet the computing resource requirement and the storage resource requirement, and generates, based on identifiers of the one or more hosts, the host list corresponding to the acceleration requirement.

In the disclosure, the accelerator loading apparatus determines the host list based on the storage resource requirement of the to-be-created virtual machine and the computing resource requirement of the to-be-created virtual machine, to ensure that a found host can support a service requirement of the to-be-created virtual machine.

Based on any one of the second to the fourth implementations of the first aspect, in a fifth implementation of the first aspect, when determining one of the at least one candidate host as the target host, the accelerator loading apparatus selects one of the at least one candidate host as the target host based on a host filtering rule.

The to-be-created virtual machine can be finally created on only one target host. Therefore, if there are a plurality of candidate hosts that meet various requirements of the to-be-created virtual machine, the accelerator loading apparatus selects a most appropriate target host from the plurality of candidate hosts based on the host filtering rule, so that load balancing or maximum system efficiency can be implemented.

When sending the image loading command to the target host, the accelerator loading apparatus receives an image request sent by the target host. The image request includes the descriptor of the image. The accelerator loading apparatus obtains the image based on the descriptor of the image, and sends the image to the target host.

According to the method, the accelerator loading apparatus interacts with the target host, and sends the image to the target host, so that the image is loaded to a host suitable to create the to-be-created virtual machine.

After sending the image to the target host, the accelerator loading apparatus further receives a notification message sent by the target host. The notification message includes the identifier of the target host, the identifier of the available accelerator, the acceleration function, and the acceleration performance. The accelerator loading apparatus updates the acceleration database based on the acceleration function and the acceleration performance, and changes a status of the available accelerator into "locked".

The accelerator loading apparatus updates the acceleration database, so that information in the acceleration database can reflect latest statuses of accelerators on all hosts in real time, thereby accurately searching for the accelerator, and avoiding an image loading failure caused by untimely information updating.

According to a second aspect of the disclosure, an accelerator loading apparatus is provided, including a computation management function, an acceleration management controller, an accelerator image repository, and an acceleration database. The foregoing components cooperate to implement the method in the first aspect and each implementation of the first aspect, and achieve corresponding effects.

According to a third aspect of the disclosure, an accelerator loading system is provided, including the accelerator loading apparatus in the second aspect and at least one host. The at least one host includes a target host determined by the accelerator loading apparatus.

According to a fourth aspect of the disclosure, another accelerator loading apparatus is provided, including a processor, a first memory, a second memory, and a communications interface. The first memory is configured to store computation management program code and acceleration management program code, and the second memory is configured to store an accelerator image repository and an acceleration database. The processor is configured to: invoke the computation management program code to implement the computation management function in the first aspect and the second aspect, and invoke the acceleration management program code to implement the functions of the acceleration management controller in the first aspect and the second aspect. In a process of invoking the computation management program code and/or the acceleration management program code, the processor further performs an operation such as searching, reading, or updating on the accelerator image repository and/or the acceleration database as required.

According to a fifth aspect of the disclosure, a storage medium is provided, and is configured to store computer program code. When the computer program code runs, the method in the first aspect and each implementation of the first aspect in the disclosure can be implemented, and corresponding effects can be achieved.

In the disclosure, a target host that can create the virtual machine may be determined based on the acceleration function and the acceleration performance of the to-be-created virtual machine, and an image used for acceleration is loaded to an available accelerator of the target host, to implement dynamic accelerator loading and deployment.

BRIEF DESCRIPTION OF DRAWINGS

To describe technical solutions in embodiments of the disclosure more clearly, the following briefly describes the accompanying drawings for describing the embodiments.

DESCRIPTION OF EMBODIMENTS

The disclosure is described below in detail with reference to the accompanying drawings.

Figure 1:
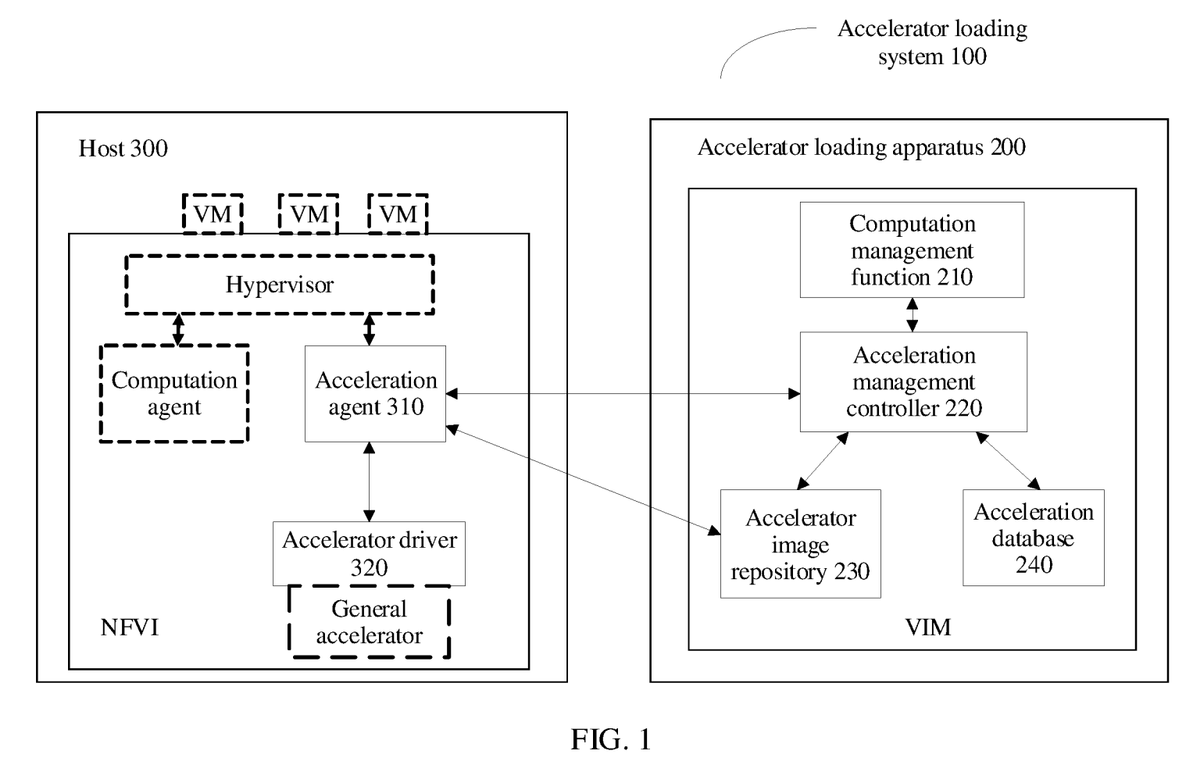
FIG. 1 is a schematic structural diagram of an accelerator loading system according to an embodiment of the disclosure.

As shown in FIG. 1, FIG. 1 is a schematic structural diagram of an accelerator loading system 100 according to an embodiment of the disclosure. The accelerator loading system 100 includes an accelerator loading apparatus 200 and one or more hosts 300. For ease of description, an example in which the accelerator loading system 100 includes one host 300 is used in FIG. 1. A virtualized infrastructure manager (VIM) is deployed on the accelerator loading apparatus 200, and an NFV infrastructure (NFVI) is deployed on the host 300. The VIM is configured to control and manage computation, storage, and network resources of all NFVIs, and each NFVI includes hardware and software components configured to establish an operating environment of a virtualized network function (VNF). Both the VIM and the NFVI are logic concepts, are merely used to describe an application scenario in this embodiment of the disclosure, and do not constitute a limitation on the disclosure. The VIM includes a computation management function 210, an acceleration management controller 220, an accelerator image repository 230, and an acceleration database 240. The accelerator image repository 230 and the acceleration database 240 may be stored in a same memory, or may be respectively stored in different memories. The NFVI includes an acceleration agent 310 and one or more accelerator drivers 320. Each accelerator driver 320 is corresponding to a general accelerator, and the general accelerator can dynamically load an image used to implement a specific function. The host 300 may further include a system management program, namely, a hypervisor, and a compute agent. The hypervisor generates at least one virtual machine (VM) on the host 300, and the compute agent is configured to communicate with the hypervisor to manage the at least one VM.

When the accelerator loading system 100 runs, the accelerator loading apparatus 200 obtains an acceleration requirement. The acceleration requirement includes an acceleration function and acceleration performance that are required by a to-be-created virtual machine such as a first VM. The accelerator loading apparatus 200 determines an image that meets the acceleration function and the acceleration performance. The accelerator loading apparatus 200 determines, as the host 300, a target host in which an available accelerator that can load the image is located, and the host 300 is one of at least one host. The accelerator loading apparatus 200 sends an image loading command to the host 300. The image loading command includes a descriptor of the image, and the descriptor of the image is at least one of an identifier of the image and a location of the image. The host 300 receives the image loading command, obtains the image based on the descriptor of the image, and loads the image for the available accelerator.

When determining the image that meets the acceleration function and the acceleration performance, the accelerator loading apparatus 200 searches the accelerator image repository 230 based on the acceleration function and the acceleration performance, to determine the image that meets the acceleration requirement, and obtain a descriptor of the image and an accelerator model corresponding to the image. The descriptor of the image is at least one of an identifier of the image and a location of the image. The accelerator image repository 230 is configured to store an image and image information. Image information of each image includes a descriptor of the image, an accelerator model corresponding to the image, an acceleration function that can be provided by the image, and acceleration performance that can be provided by the image. The accelerator image repository 230 is subsequently described in detail with reference to the accompanying drawings.

When determining the target host in which the available accelerator that can load the image is located, the accelerator loading apparatus 200 further determines at least one candidate host corresponding to the accelerator model and an available accelerator of each candidate host, and determines one of the at least one candidate host as the target host.

The host 300 further sends an image request to the accelerator loading apparatus 200, and the image request includes the descriptor of the image. The accelerator loading apparatus 200 further obtains the image based on the descriptor of the image, and sends the image to the host 300. The host 300 further receives the image, and loads the image for an accelerator driver corresponding to the available accelerator.

The accelerator loading apparatus 200 further obtains a host list corresponding to the acceleration requirement, and the host list includes an identifier of at least one host that meets the acceleration requirement. The accelerator loading apparatus 200 further searches the acceleration database based on the accelerator model and the host list to determine the at least one candidate host corresponding to the accelerator model in the host list and the available accelerator of each candidate host. The acceleration database is configured to store acceleration information of each host managed by the accelerator loading apparatus, and the acceleration information of each host includes an identifier of the host, an identifier of each accelerator of the host, an accelerator model of the accelerator, an acceleration function of the accelerator, acceleration performance corresponding to the acceleration function of the accelerator, an attribute of the accelerator, and a status of the accelerator. The acceleration database 240 is subsequently described in detail with reference to the accompanying drawings.

When obtaining the host list, the accelerator loading apparatus 200 obtains a computing resource requirement and a storage resource requirement of the to-be-created virtual machine, searches, based on the computing resource requirement and the storage resource requirement, all hosts managed by the accelerator loading apparatus 200 for one or more hosts that can meet the computing resource requirement and the storage resource requirement, and generates, based on identifiers of the one or more hosts, the host list corresponding to the acceleration requirement.

When determining one of the at least one candidate host as the target host, the accelerator loading apparatus 200 selects one of the at least one candidate host as the target host based on a host filtering rule. The host filtering rule is a rule for selecting one host from a plurality of hosts that meet the acceleration requirement. That the host filtering rule is a rule may mean that a host with minimum load is selected. The host filtering rule may also be referred to as an acceleration resource constraint.

The host 300 further sends a notification message to the accelerator loading apparatus 200, and the notification message includes the identifier of the host 300, the identifier of the available accelerator, the acceleration function, and the acceleration performance. The accelerator loading apparatus 200 further updates the acceleration database based on the acceleration function and the acceleration performance, and changes a status of the available accelerator into "locked".

The accelerator loading apparatus 200 and the host 300 may be on a same physical server, or may be on different physical servers.

Based on the accelerator loading system shown in FIG. 1, the disclosure provides an accelerator loading method, and the method is performed by the accelerator loading apparatus 200 in FIG. 1. In an embodiment, the method includes steps shown in FIG. 2.

Figure 2:
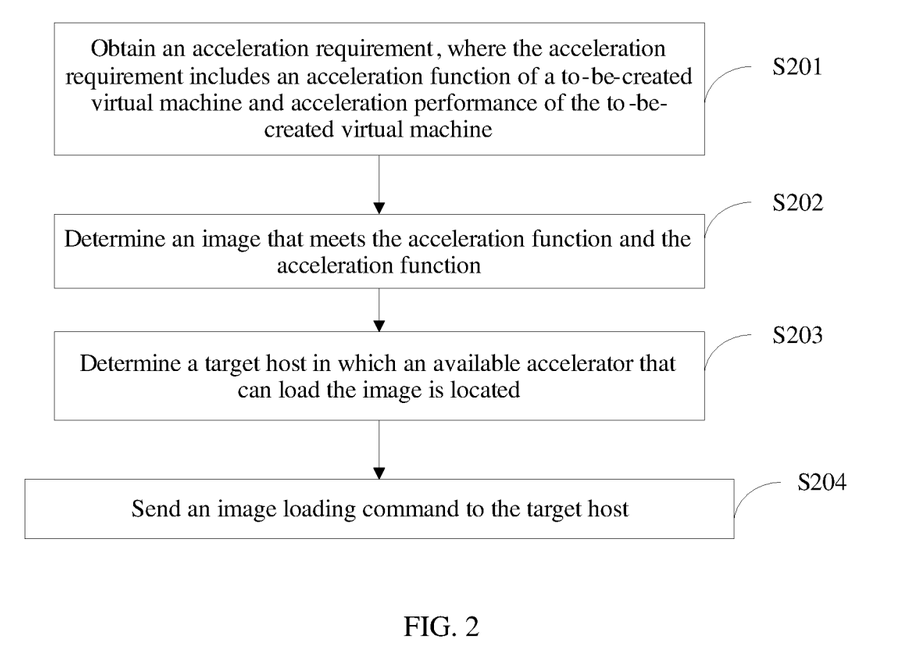
FIG. 2 is a schematic flowchart of an accelerator loading method according to an embodiment of the disclosure.

In S201, the accelerator loading apparatus 200 obtains an acceleration requirement, where the acceleration requirement includes an acceleration function of a to-be-created virtual machine and acceleration performance of the to-be-created virtual machine.

In S202, the accelerator loading apparatus 200 determines an image that meets the acceleration function and the acceleration performance. In S203, the accelerator loading apparatus 200 determines a target host 300 in which an available accelerator that can load the image is located. In S204, the accelerator loading apparatus 200 sends an image loading command to the target host 300. The image loading command includes a descriptor of the image, and the image loading command is used to enable the target host 300 to load the image for the available accelerator based on the image loading command.

For specific implementations of the steps in the method shown in FIG. 2, refer to the descriptions of the accelerator loading apparatus 200 when the accelerator loading system shown in FIG. 1 is described.

In the foregoing manner, the accelerator loading apparatus may load different images for available accelerators on hosts, so that a same accelerator implements different functions based on the loaded different images, thereby implementing accelerator allocation as required, and avoiding a hardware resource waste caused by configuring a corresponding hardware accelerator for each acceleration function.

The accelerator loading system shown in FIG. 1 and the accelerator loading method shown in FIG. 2 are described below in detail with reference to FIG. 3.

Figure 3:
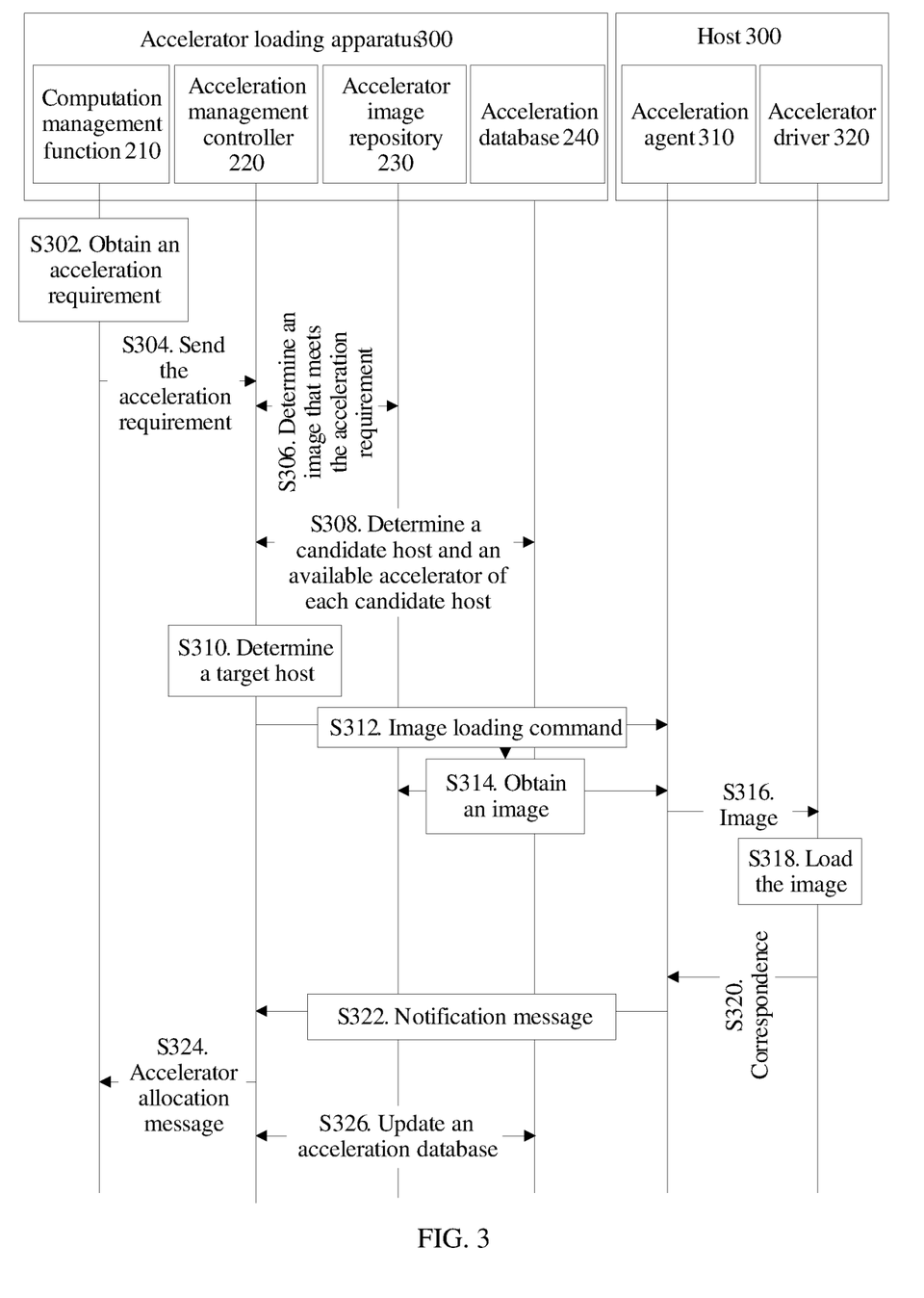
FIG. 3 is a schematic flowchart of another accelerator loading method according to an embodiment of the disclosure.

When S201 is implemented, the computation management function 210 of the accelerator loading apparatus 200 performs step S302 in FIG. 3.

In S302, the computation management function 210 obtains a request for creating a virtual machine. The request for creating a virtual machine includes an acceleration requirement of the to-be-created virtual machine, and the acceleration requirement includes the acceleration function of the to-be-created virtual machine and the acceleration performance of the to-be-created virtual machine.

The request for creating a virtual machine may further include a computing resource requirement of the to-be-created virtual machine and a storage resource requirement of the to-be-created virtual machine.

The request for creating a virtual machine may be triggered when a user needs to deploy a virtual machine. For example, the computing resource requirement may be a specification of a central processing unit (CPU) required by the to-be-created virtual machine. The specification may include a quantity of compute engines (or referred to as cores) included in the CPU. For example, the storage resource requirement may be a size of storage space required by the to-be-created virtual machine, for example, 120 GB. For example, the acceleration function of the to-be-created virtual machine may include one or more of encryption or decryption, compression or decompression, layer 3 forwarding, and virtual extensible local area network (VXLAN) forwarding. The acceleration performance of the to-be-created virtual machine includes a speed at which the acceleration function of the to-be-created virtual machine is implemented, for example, a rate of the VXLAN forwarding: 20 gigabits per second (Gbps). Further, when the acceleration function of the to-be-created virtual machine is a forwarding function, the request for creating a virtual machine may further include a specification of a forwarding table, namely, a maximum quantity of entries of the forwarding table.

When S202 is implemented, the computation management function 210 and the acceleration management controller 220 of the accelerator loading apparatus 200 perform S304 and S306 in FIG. 3.

In S304, the computation management function 210 sends the acceleration requirement of the to-be-created virtual machine to the acceleration management controller 220, and the acceleration requirement of the to-be-created virtual machine includes the acceleration function of the to-be-created virtual machine and the acceleration performance of the to-be-created virtual machine.

For example, the acceleration function of the to-be-created virtual machine that is included in the acceleration requirement of the to-be-created virtual machine is the VXLAN forwarding, and the acceleration performance of the to-be-created virtual machine is 20 Gbps.

In S306, the acceleration management controller 220 searches the accelerator image repository 230 based on the acceleration function of the to-be-created virtual machine and the acceleration performance of the to-be-created virtual machine to determine the image that meets the acceleration requirement of the to-be-created virtual machine and obtain a descriptor of the image and an accelerator model corresponding to the image.

Figure 4:
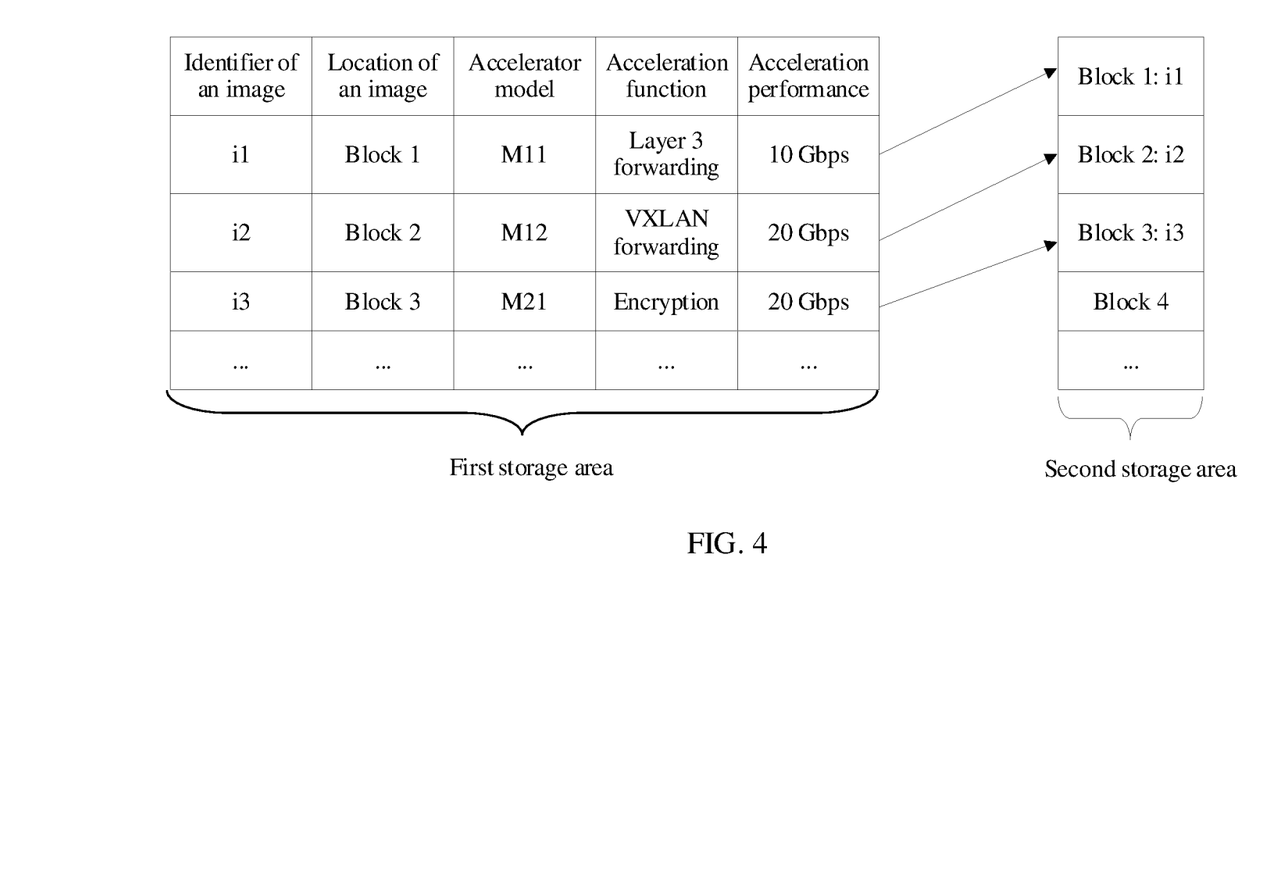
FIG. 4 is a schematic structural diagram of an accelerator image repository according to an embodiment of the disclosure.

The accelerator image repository 230 is configured to store an image and image information. Image information of each image includes a descriptor of the image, an accelerator model corresponding to the image, an acceleration function that can be provided by the image, and acceleration performance that can be provided by the image. The image is code that can implement a function after being loaded, and the descriptor of the image is at least one of an identifier of the image and a location of the image. The location of the image is a location at which the image is stored in the accelerator image repository 230. The accelerator model is a string of letters and numbers used to indicate a type of an accelerator, for example, M11, M12, and M13 shown in FIG. 4. As shown in FIG. 4, FIG. 4 is a schematic structural diagram of an accelerator image repository 230. The accelerator image repository 230 may include a first storage area and a second storage area. The first storage area is used to store image information. For example, FIG. 4 provides image information of images i1, i2, and i3. The second storage area is used to store an image. In an implementation, the second storage area may include a plurality of data blocks. The location of the image is a data block occupied by the image in the second storage area. For example, the images i1 to i3 are respectively stored in a block 1 to a block 3.

When the acceleration function of the to-be-created virtual machine is the VXLAN forwarding, and the acceleration performance of the to-be-created virtual machine is 20 Gbps, the acceleration management controller 220 determines that the image that meets the acceleration requirement is i2, and determines that an accelerator model corresponding to the image i2 is M12. When there are a plurality of images that meet the acceleration function and the acceleration performance, in S306, the acceleration management controller 220 obtains a descriptor of each image and an accelerator model corresponding to the image.

Optionally, before S306, the method further includes: The acceleration management controller 220 searches the acceleration database 240 based on the acceleration function and the acceleration performance, and when finding no locked accelerator that meets the acceleration requirement, performs S306. The acceleration database 240 stores acceleration information of all hosts managed by the accelerator loading apparatus. Acceleration information of each host includes an identifier of the host, an identifier of each accelerator of the host, an accelerator model of the accelerator, an acceleration function of the accelerator, acceleration performance corresponding to the acceleration function of the accelerator, an attribute of the accelerator, and a status of the accelerator. The attribute of the accelerator includes "loadable" and "unloadable", "loadable" means that the accelerator can dynamically load different images to implement different acceleration functions, and "unloadable" means that a function of the accelerator is fixed or the accelerator can load only a specific image. The status of the accelerator includes "allocated", "locked", and "idle". An allocated accelerator is an accelerator that has been used by a virtual machine. A locked accelerator is an accelerator that has loaded an image and that is to be allocated to a virtual machine for use. The locked accelerator cannot load a new image. An idle accelerator is an accelerator that can load an image. The idle accelerator may be an accelerator that has loaded an image and whose loaded image is released, or may be an accelerator that loads no image. In the disclosure, an accelerator whose attribute is "loadable" and status is "idle" is referred to as the available accelerator. An acceleration function and acceleration performance that are corresponding to an accelerator whose status is "allocated" or "locked" in the acceleration database 240 are an acceleration function and acceleration performance that can be actually provided by the accelerator. If an accelerator whose attribute is "loadable" and status is "idle" in the acceleration database 240 has a corresponding acceleration function and acceleration performance, it indicates that the accelerator has loaded an image, but the image is released. If the accelerator has no corresponding acceleration function and acceleration performance, it indicates that the accelerator has loaded no image.

Figure 5A:
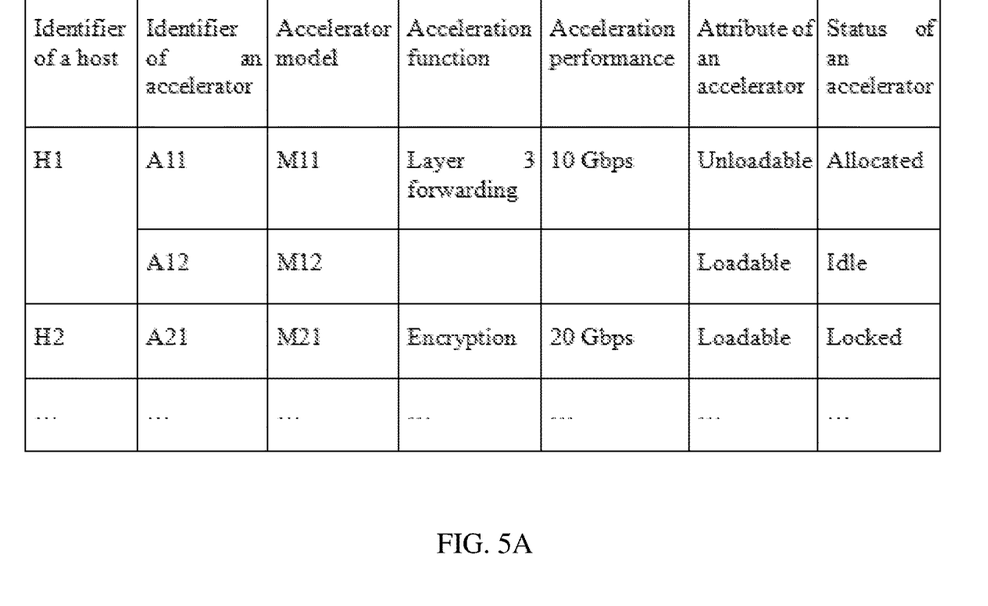
FIG. 5A is a schematic structural diagram of a to-be-updated acceleration database according to an embodiment of the disclosure.

As shown in FIG. 5A, FIG. 5A is a schematic diagram of an acceleration database 240 according to an embodiment of the disclosure. The acceleration database 240 stores information about an accelerator corresponding to each host. In FIG. 5A, a host H1 has two accelerators: A11 and A12. The accelerator A11 is an unloadable accelerator, and has been allocated to a virtual machine for acceleration of the layer 3 forwarding. The accelerator A12 is an idle accelerator, and loads no image. A host H2 has one accelerator: A21, and the accelerator A21 has loaded an image, but is not allocated to a virtual machine for use.

When S203 is implemented, the acceleration management controller 220 performs S308 and S310 in FIG. 3.

In S308, the acceleration management controller 220 determines at least one candidate host corresponding to the accelerator model and an available accelerator of each candidate host. S308 may include the following sub-steps: S308-1 and S308-2.

In S308-1, the acceleration management controller 220 obtains a host list corresponding to the acceleration requirement.

The host list includes an identifier of at least one host that meets the acceleration requirement. The identifier of the host is used to uniquely identify the host.

In an implementation of S308-1, the acceleration requirement sent by the computation management function 210 to the acceleration management controller 220 further includes the host list, and the host list includes information about all hosts that are managed by the accelerator loading apparatus 200 and that can meet the computing resource requirement and the storage resource requirement. That is, in this implementation, S308-1 includes: The acceleration management controller 220 receives the host list corresponding to the acceleration requirement sent by the computation management function 210. The host list may be included in the acceleration requirement, or may be individually sent by the computation management function 210 to the acceleration management controller 220.

The accelerator loading apparatus 200 stores the information about all the hosts managed by the accelerator loading apparatus 200. Information about each host includes a compute resource and a storage resource that can be provided by the host. The accelerator loading apparatus 200 can manage a host configured by an administrator, and the information about all the hosts may be stored in any storage space planned by the accelerator loading apparatus 200. When obtaining the host list, the computation management function 210 searches, based on the computing resource requirement and the storage resource requirement, all the hosts for one or more hosts that can meet the computing resource requirement and the storage resource requirement, generates the host list based on identifiers of the one or more hosts, and sends the host list to the acceleration management controller 220.

In another implementation of S308-1, the acceleration requirement further includes the computing resource requirement and the storage resource requirement. Obtaining of the host list corresponding to the acceleration requirement includes: The acceleration management controller 220 searches, based on the computing resource requirement and the storage resource requirement, all hosts managed by the accelerator loading apparatus for one or more hosts that can meet the computing resource requirement and the storage resource requirement, and generates the host list based on identifiers of the one or more hosts.

In S308-2, the acceleration management controller 220 searches the acceleration database 240 based on the accelerator model and the host list to determine the at least one candidate host corresponding to the accelerator model in the host list and the available accelerator of each candidate host.

The acceleration management controller 220 may first find all hosts corresponding to the accelerator model in the acceleration database 240 to serve as a comparison list, determine, one by one, whether hosts in the host list are in the comparison list, and determine a host simultaneously existing in the comparison list and the host list as a candidate host. There may be one or more candidate hosts. Further, the acceleration management controller 220 may further search the acceleration database 240 to determine, as the available accelerator, a general accelerator that is on each candidate host and whose status is "idle" and attribute is "loadable".

For example, when the acceleration function is the VXLAN forwarding, the acceleration performance is 20 Gbps, and the host list includes the host H1 and the host H2, the acceleration management controller 220 searches the acceleration database shown in FIG. 5A to determine that a candidate host is the host H1 and an available accelerator of the host H1 is the accelerator A12.

In S310, the acceleration management controller 220 determines one of the at least one candidate host as the target host.

In an implementation of S310, when the host list includes a plurality of hosts, the acceleration requirement further includes a host filtering rule, and S310 includes: The acceleration management controller 220 selects one of the at least one candidate host as the target host based on the host filtering rule.

In another implementation of S310, the acceleration requirement does not include a host filtering rule, and S310 includes the following sub-steps.

S310-1. The acceleration management controller 220 sends a candidate host notification message to the computation management function, where the candidate host notification message includes information about the at least one candidate host.

S310-2. The computation management function 210 selects one of the at least one candidate host as the target host based on the host filtering rule.

S310-3. The acceleration management controller 220 receives the information about the target host that is sent by the computation management function 210, and determines the target host based on the information about the target host.

The information about the target host includes at least an identifier of the target host.

When there is only one candidate host, the acceleration management controller 220 directly determines the candidate host as the target host, for example, H1 in FIG. 5A.

When S204 is implemented, the acceleration management controller 220 performs S312 in FIG. 3.

In S312, the acceleration management controller 220 sends the image loading command to the acceleration agent 310 of the target host. The image loading command includes the descriptor of the image and an identifier of the available accelerator of the target host.

To load the image, as shown in FIG. 3, the acceleration agent 310 and the accelerator driver 320 in the target host 300 also correspondingly perform some operations.

In S314, the acceleration agent 310 obtains the image from the accelerator image repository 230.

Before S314, the method may further include: The acceleration agent 310 determines, based on the descriptor of the image, whether the image is locally cached, and performs S314 if the image is not cached.

In an implementation of S314, the acceleration agent 310 sends an image request to the accelerator image repository 230, and the image request includes the descriptor of the image. Then, the acceleration agent 310 receives the image sent by the accelerator image repository 230. In another implementation of S314, the acceleration agent 310 sends an image request to the acceleration management controller 220, and the image request includes the descriptor of the image. After receiving the image request, the acceleration management controller 220 accesses the accelerator image repository 230 based on the descriptor of the image, to obtain the image and send the obtained image to the acceleration agent 310.

As shown in FIG. 3, to correctly load the image to the accelerator, the method further includes S316 and S318.

In S316, the acceleration agent 310 receives the image, and sends the image to the accelerator driver 320 corresponding to the available accelerator.

In S318, the accelerator driver 320 loads the image, so that the available accelerator can implement the acceleration function.

Further, to more accurately manage the accelerator, as shown in FIG. 3, the method further includes the following steps.

In S320, the accelerator driver 320 sends a correspondence between the identifier of the available accelerator, the acceleration function, and the acceleration performance to the acceleration agent 310.

In S322, the acceleration agent 310 sends a notification message to the acceleration management controller 220, and the notification message includes the identifier of the target host, the identifier of the available accelerator, the acceleration function, and the acceleration performance.

The identifier of the target host may be an Internet Protocol (IP) address or a media access control (MAC) address of the host, or may be another information that can uniquely identify the target host.

In S324, after receiving the notification message, the acceleration management controller 220 sends an accelerator allocation message to the computation management function 210, and the accelerator allocation message includes the identifier of the target host.

The accelerator allocation message is used to notify the computation management function 210 that the image has been loaded for the accelerator on the target host.

In S326, after receiving the notification message, the acceleration management controller 220 may further update the acceleration database 240 based on the notification message.

Figure 5B:
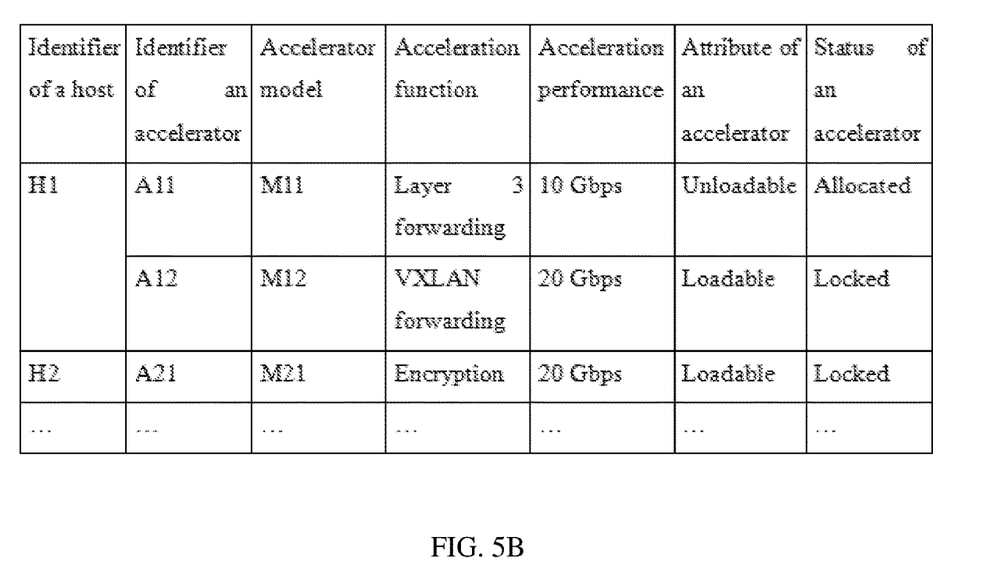
FIG. 5B is a schematic structural diagram of an updated acceleration database according to an embodiment of the disclosure.

Specifically, an acceleration function and acceleration performance that are corresponding to the available accelerator in the acceleration database 240 are updated to the acceleration function and the acceleration performance in the notification message, and a status of the available accelerator is changed into "locked". As shown in FIG. 5B, FIG. 5B shows an updated acceleration database 240. The accelerator A12 has loaded an image that can provide acceleration performance of 20-Gbps VXLAN forwarding.

Therefore, a status is changed into "locked" because an acceleration function and acceleration performance that are corresponding to the A12 are updated. Therefore, the accelerator A12 completes loading, and may be allocated to a virtual machine for use.

The numbers of the steps in FIG. 2 and FIG. 3 are merely used for ease of description, and do not constitute a limitation on an execution sequence of the steps.

Figure 6:
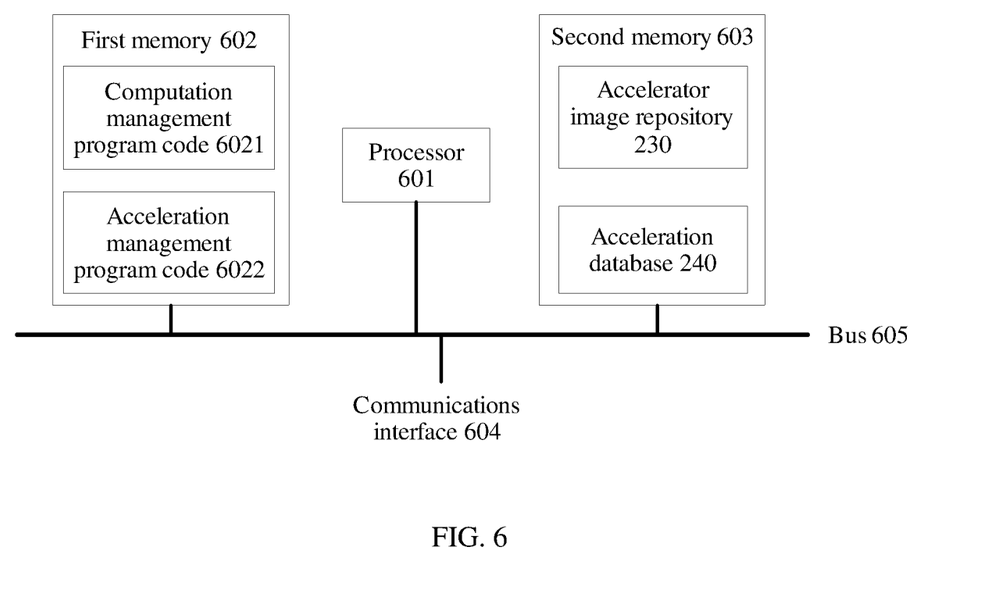
FIG. 6 is a schematic structural diagram of an accelerator loading apparatus according to an embodiment of the disclosure.

Based on the method shown in FIG. 2 and FIG. 3, another embodiment of the disclosure provides an accelerator loading apparatus. As shown in FIG. 6, the accelerator loading apparatus includes a processor 601, a first memory 602, a second memory 603, and a communications interface 604. The processor 601, the first memory 602, the second memory 603, and the communications interface 604 communicate with each other by using a bus 605. The first memory 602 stores computation management program code 6021 and acceleration management program code 6022, and the second memory 603 stores an accelerator image repository 230 and an acceleration database 240.

The processor 601 is configured to: invoke the computation management program code 6021 to perform the steps performed by the computation management function 210 in FIG. 2 and FIG. 3, invoke the acceleration management program code 6022 to perform the steps performed by the acceleration management controller 220 in FIG. 2 and FIG. 3, and perform an operation such as searching, reading, or updating on the accelerator image repository 230 and the acceleration database 240 in a process of invoking the computation management program code 6021 or the acceleration management program code 6022.

The communications interface 604 is a set of interfaces used to communicate with an external device, and includes at least an interface used to obtain a request for creating a virtual machine, and an interface used to communicate with the processor 601 by executing a target host selected by the computation management program code 6021.

The computation management program code 6021 and the acceleration management program code 6022 may be two separate computer programs, or may be two segments of a same computer program.

In an implementation, the processor 601 in this embodiment of the disclosure may include two processors. One processor is configured to execute the computation management program code 6021, and the other processor is configured to execute the acceleration management program code 6022.

The first memory 602 and the second memory 603 may be two physically separate memories, or may be in a same physical storage device. Similarly, the accelerator image repository 230 and the acceleration database 240 may be in a same memory, or may be in different memories.

An embodiment of the disclosure further provides a computer storage medium, and the computer storage medium may store one or more programs. When the one or more programs are executed, some or all steps of the accelerator loading method described in the foregoing method embodiments can be implemented. In other words, when a computer device including one or more processors runs the one or more programs, the computer device performs the accelerator loading method described in the foregoing method embodiments.

In the disclosure, when a virtual machine needs to be created, the accelerator loading apparatus may determine, based on the acceleration function, the acceleration performance, the computing resource requirement, and the storage resource requirement of the to-be-created virtual machine, a target host that can create the virtual machine, and load an image used for acceleration to an available accelerator of the target host, to implement dynamic accelerator loading and deployment.

The foregoing descriptions are merely example implementations of the disclosure. It should be noted that a person of ordinary skill in the art may make several improvements or polishing without departing from the principle of the disclosure and the improvements or polishing shall fall within the protection scope of the disclosure.

What is claimed is:

1. An accelerator loading method implemented by an accelerator loading apparatus, the accelerator loading method comprising:
   obtaining an acceleration requirement comprising a first acceleration function and a first acceleration performance of a to-be-created virtual machine;
   searching an accelerator image repository based on the first acceleration function and the first acceleration performance to determine a first image that meets the acceleration requirement and to obtain a first descriptor and a first accelerator model of the first image, wherein the first descriptor is a first identifier or a first location of the first image, wherein the accelerator image repository comprises images and image information, and wherein image information of each image comprises a descriptor, an accelerator model, an acceleration function, and acceleration performance of the image;
   determining a target host comprising a first available accelerator that can load the first image; and
   sending to the target host an image loading command comprising the first descriptor and a second identifier of the first available accelerator,
   wherein the image loading command enables the target host to load the first image for the first available accelerator based on the image loading command.

2. The accelerator loading method of claim 1, wherein determining the target host comprises:
   determining candidate hosts corresponding to the first accelerator model;
   determining an available accelerator of each of the candidate hosts; and
   selecting a first candidate host of the candidate hosts as the target host.

3. The accelerator loading method of claim 2, wherein determining the candidate hosts comprises:
   obtaining a host list corresponding to the acceleration requirement, wherein the host list comprises identifiers of hosts that meet the acceleration requirement; and
   searching an acceleration database based on the first accelerator model and the host list to determine the candidate hosts corresponding to the first accelerator model and the first available accelerator.

4. The accelerator loading method of claim 3, wherein obtaining the acceleration requirement comprises:
   obtaining a request for creating a virtual machine, wherein the request comprises a computing resource requirement of the to-be-created virtual machine, a storage resource requirement of the to-be-created virtual machine, and the acceleration requirement;
   searching all hosts managed by the accelerator loading apparatus for hosts that meet the computing resource requirement and the storage resource requirement; and
   generating the host list based on the identifiers.

5. The accelerator loading method of claim 2, further comprising further selecting the first candidate host as the target host based on a host filtering rule.

6. The accelerator loading method of claim 1, further comprising:
receiving from the target host an image request comprising the first descriptor;
obtaining the first image based on the first descriptor; and
sending the first image to the target host.

7. The accelerator loading method of claim 6, further comprising:
receiving from the target host a notification message comprising a third identifier of the target host, the second identifier, the first acceleration function, and the first acceleration performance;
updating an acceleration database based on the first acceleration function and the first acceleration performance; and
changing a status of the first available accelerator to locked.

8. An accelerator loading apparatus comprising:
a communications interface;
an accelerator image repository configured to store images and image information, wherein image information of each image comprises a descriptor, an accelerator mode, an acceleration function, and acceleration performance of the image; and
a processor coupled to the communications interface and configured to:
obtain an acceleration requirement comprising a first acceleration function of and a first acceleration performance of a to-be-created virtual machine;
search the accelerator image repository based on the first acceleration function and the first acceleration performance to determine a first image that meets the acceleration requirement and to obtain a first descriptor and a first accelerator model of the first image, wherein the first descriptor is a first identifier or a first location of the first image;
determine a target host comprising a first available accelerator that can load the first image; and
send, to the target host and through the communications interface, an image loading command comprising the first descriptor and a second identifier of the first available accelerator,
wherein the image loading command enables the target host to load the first image for the first available accelerator based on the image loading command.

9. The accelerator loading apparatus of claim 8, wherein the processor is further configured to further determine the target host by:
determining candidate hosts corresponding to the first accelerator model;
determining an available accelerator of each of the candidate hosts; and
selecting a first candidate host of the candidate hosts as the target host.

10. The accelerator loading apparatus of claim 9, further comprising an acceleration database configured to store acceleration information of each host managed by the accelerator loading apparatus, wherein the acceleration information of each host comprises an identifier of the host, an identifier of each accelerator of the host, an accelerator model of the accelerator, an acceleration function of the accelerator, acceleration performance corresponding to the acceleration function of the accelerator, an attribute of the accelerator, and a status of the accelerator, and wherein the processor is further configured to further determine the candidate hosts by:

obtaining a host list corresponding to the acceleration requirement, wherein the host list comprises identifiers of hosts that meet the acceleration requirement; and
searching the acceleration database based on the first accelerator model and the host list to determine the candidate hosts corresponding to the first accelerator model and the first available accelerator.

11. The accelerator loading apparatus of claim 10, wherein the processor is further configured to further obtain the acceleration requirement by:
obtain a request for creating a virtual machine, wherein the request comprises a computing resource requirement of the to-be-created virtual machine, a storage resource requirement of the to-be-created virtual machine, and the acceleration requirement;
search all hosts managed by the accelerator loading apparatus for hosts that meet the computing resource requirement and the storage resource requirement; and
generate the host list based on the identifiers.

12. The accelerator loading apparatus of claim 10, wherein the acceleration requirement further comprises a computing resource requirement of the to-be-created virtual machine and a storage resource requirement of the to-be-created virtual machine, and wherein the processor is further configured to further obtain the host list by:
searching the accelerator loading apparatus for hosts that meet the computing resource requirement and the storage resource requirement, and
generating the host list based on the identifiers.

13. The accelerator loading apparatus of claim 9, wherein the acceleration requirement further comprises a host filtering rule, and wherein the processor is further configured to further select the first candidate host as the target host based on the host filtering rule.

14. The accelerator loading apparatus of claim 8, wherein the processor is further configured to send the image loading command to an acceleration agent of the target host, and wherein the image loading command enables the acceleration agent to load the first image for an accelerator driver corresponding to the first available accelerator.

15. The accelerator loading apparatus of claim 14, wherein the processor is further configured to:
receive, from the target host through the communications interface, an image request comprising the first descriptor;
obtain the first image based on the first descriptor; and
send the first image to the target host through the communications interface.

16. The accelerator loading apparatus of claim 14, wherein the processor is further configured to:
receive, from the target host through the communications interface, a notification message comprising a third identifier of the target host, the second identifier, the first acceleration function, and the first acceleration performance;
update an acceleration database based on the first acceleration function and the first acceleration performance; and
change a status of the first available accelerator to locked.

17. An accelerator loading system comprising:
a plurality of hosts comprising a target host; and
an accelerator loading apparatus comprising an accelerator image repository configured to store images and image information, wherein image information of each image comprises a descriptor, an accelerator model, an acceleration function, and acceleration performance of the image, and wherein the accelerator loading apparatus is configured to:
- obtain an acceleration requirement comprising a first acceleration function and a first acceleration performance of a to-be-created virtual machine;
- search the accelerator image repository based on the first acceleration function and the first acceleration performance to determine a first image that meets the acceleration requirement and to obtain a first descriptor and a first accelerator model of the first image, wherein the first descriptor is a first identifier or a first location of the first image;
- determine that the target host comprises a first available accelerator that can load the first image; and
- send to the target host an image loading command comprising the first descriptor, wherein the target host is configured to:
- receive the image loading command;
- obtain the first image based on the first descriptor; and
- load the first image for the first available accelerator.

18. The accelerator loading system of claim 17, wherein the accelerator loading apparatus is further configured to further determine that the target host comprises the first available accelerator by:
- determining candidate hosts corresponding to the first accelerator model;
- determining an available accelerator of each of the candidate hosts; and
- selecting a first candidate host of the candidate hosts as the target host.

19. The accelerator loading method of claim 3, wherein the acceleration database comprises acceleration information of each host managed by the accelerator loading apparatus, and wherein the acceleration information of each host comprises an identifier of the host, an identifier of each accelerator of the host, an accelerator model of the accelerator, an acceleration function of the accelerator, acceleration performance corresponding to the acceleration function of the accelerator, an attribute of the accelerator, and a status of the accelerator.

20. The accelerator loading apparatus of claim 10, wherein the acceleration database is configured to store acceleration information of each host managed by the accelerator loading apparatus, and wherein the acceleration information of each host comprises an identifier of the host, an identifier of each accelerator of the host, an accelerator model of the accelerator, an acceleration function of the accelerator, acceleration performance corresponding to the acceleration function of the accelerator, an attribute of the accelerator, and a status of the accelerator.

* * * * *

UNITED STATES PATENT AND TRADEMARK OFFICE
CERTIFICATE OF CORRECTION

PATENT NO. : 11,221,866 B2  
APPLICATION NO. : 16/407934  
DATED : January 11, 2022  
INVENTOR(S) : Qian Cao, Yuping Zhao and Xinyu Hu It is certified that error appears in the above-identified patent and that said Letters Patent is hereby corrected as shown below:

In the Claims

Claim 8, Column 15, Line 24: "mode, an acceleration" should read "model, an acceleration"

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*